July 31, 1945.   P. E. FRANTZ   2,380,590
CLUTCH
Filed Feb. 26, 1940   5 Sheets-Sheet 3

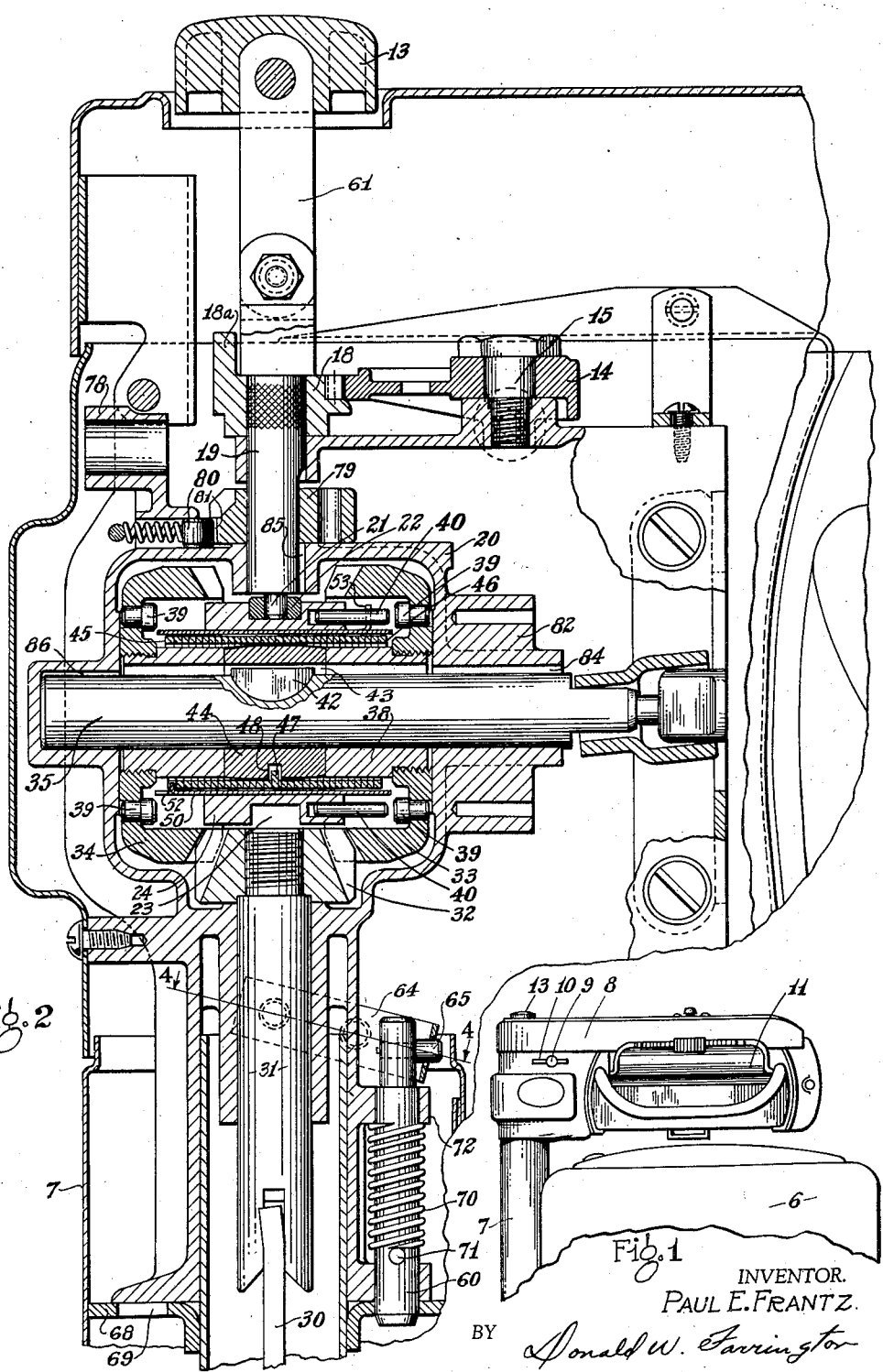

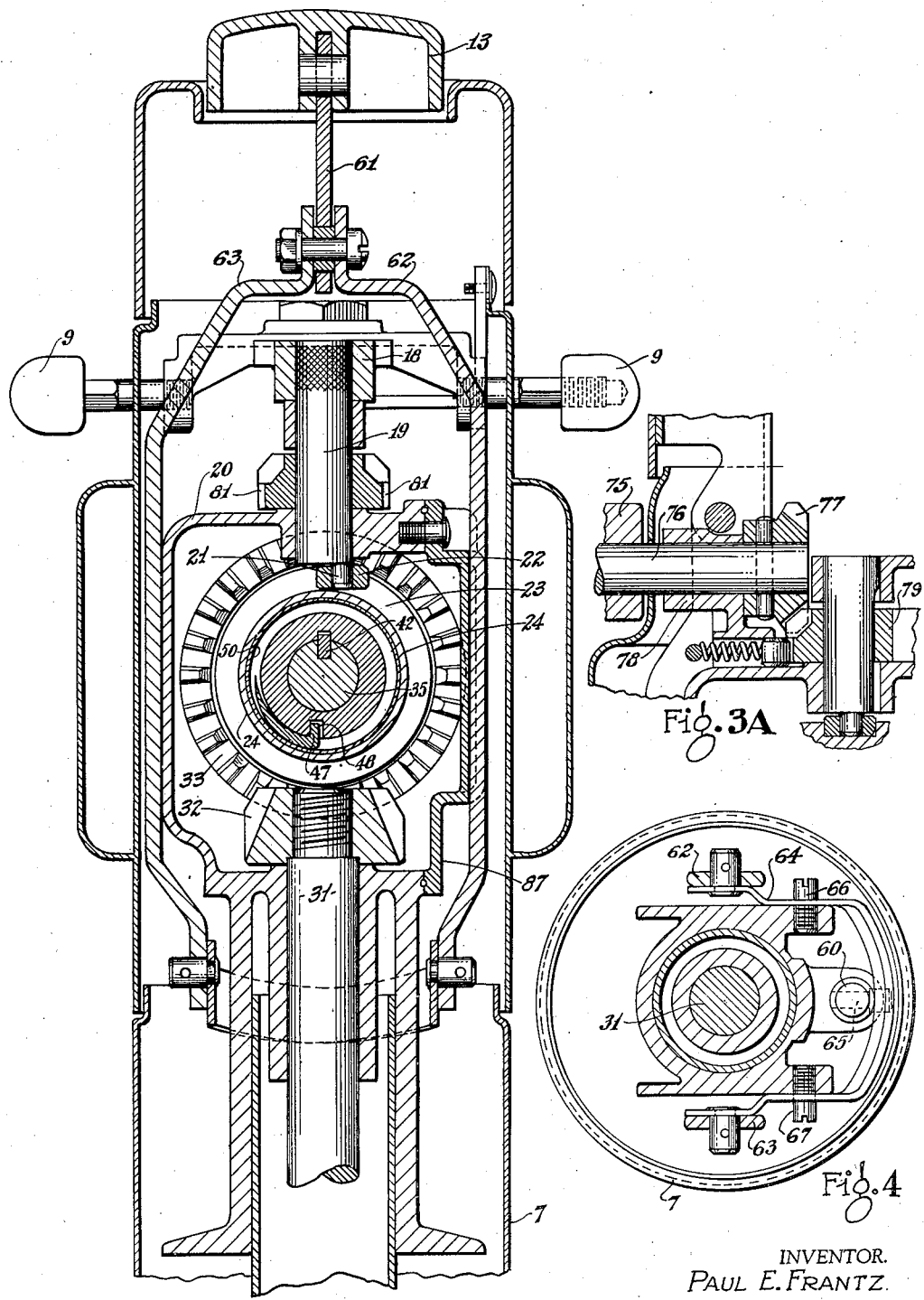

INVENTOR.
PAUL E. FRANTZ.
BY
Donald W. Farrington
ATTORNEY.

July 31, 1945.  P. E. FRANTZ  2,380,590
CLUTCH
Filed Feb. 26, 1940   5 Sheets-Sheet 4
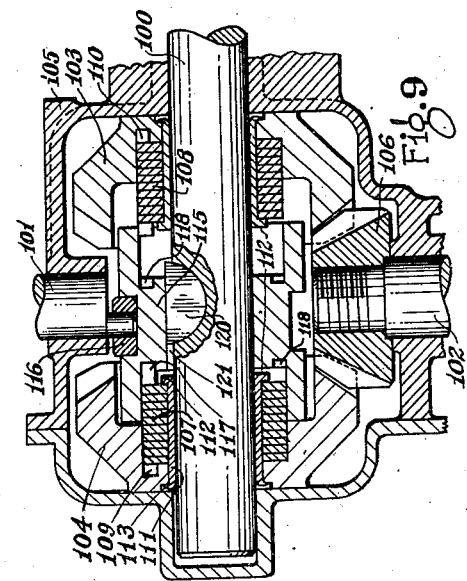
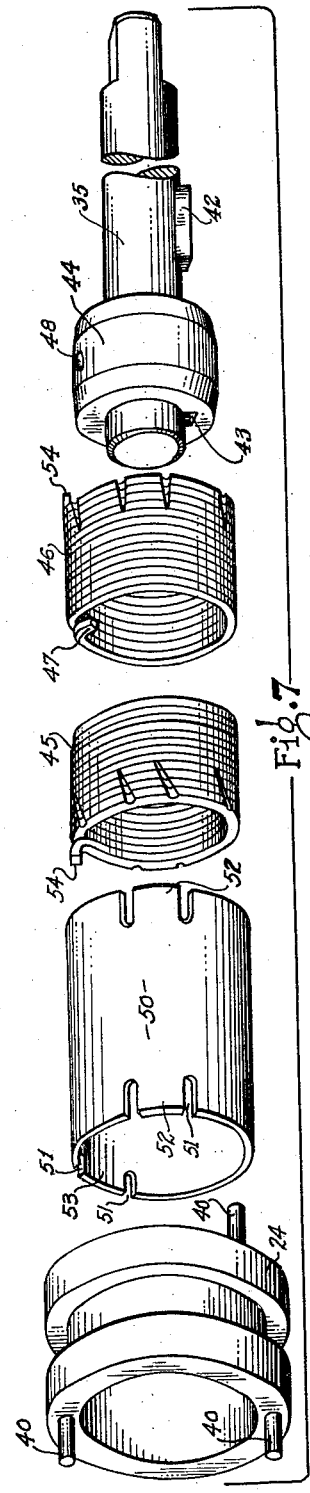
INVENTOR.
PAUL E. FRANTZ.
BY
ATTORNEY.

July 31, 1945.　　　P. E. FRANTZ　　　2,380,590
CLUTCH
Filed Feb. 26, 1940　　　5 Sheets-Sheet 5

INVENTOR.
PAUL E. FRANTZ.
BY
*Donald W. Farrington*
Attorney

Patented July 31, 1945

2,380,590

UNITED STATES PATENT OFFICE 2,380,590

CLUTCH

Paul E. Frantz, Euclid, Ohio, assignor to The Apex Electrical Manufacturing Company, Cleveland, Ohio, a corporation of Ohio Application February 26, 1940, Serial No. 320,822

2 Claims. (Cl. 192—51)

This invention relates to a washing machine wringer mechanism and more particularly to an improved clutch and control mechanism for reversing the drive through the wringer rolls.

Recent developments in washing machines have been directed toward refinements and improvements that will render the washing machine and its wringer mechanism safe and more convenient to operate. Among such developments are devices providing an interlock between the mechanism for reversing the wringer roll drive and the swinging of the wringer. Other devices have been designed with a view toward making the wringer-reversing mechanism easier to operate, since it is generally recognized that washing machines are operated by persons unskilled mechanically.

Among the prior-art wringer controls are manually-operated clutching devices which require the operator to "feel" a jaw clutch into engagement and which require considerable skill and strength on the part of the operator to move the clutch jaws out of engagement under load. To overcome such disadvantages inherent in the jaw clutch type of wringer mechanism, it has been proposed to provide a spring clutch which will require no skill and little effort on the part of the operator to effect clutching and reversing operations in the wringer. The patent to John W. Racklyeft 2,024,947 of December 17, 1935, is directed to the spring clutch type of wringer control which provides some of the advantages I have mentioned above and it is among the objects of my invention to provide an improvement in the Racklyeft type of wringer clutch mechanism.

It is a further object of my invention to provide a spring-clutch wringer mechanism in which the parts are so proportioned, designed and arranged that it is well suited to large scale production and rapid assembly.

It is a further object of my invention to provide an improved spring-clutch wringer mechanism wherein the clutch spring element is confined so that relatively soft clutch springs may be employed and so that such clutch springs will not be excessively flexed during operation.

It is a further object of my invention to provide a spring-clutch mechanism according to the preceding objects, wherein it will be unnecessary to bend the free end of the clutch spring radially outward beyond the spring convolutions so that the excessive flexing and failure attending same is eliminated.

It is a further object of my invention to provide a wringer mechanism according to the preceding objects in which the control for the clutch is interconnected with a lock to control the swinging of the wringer so that the wringer cannot be swung when the rolls are turning.

It is a further object of my invention to provide a wringer-control mechanism including a wringerhead in which the clutch may be controlled by manually-operated means extending from any one of three sides of the wringerhead.

It is a further object of my invention to provide a spring-clutch wringer mechanism in which the springer element is contracted to effect a driving relation.

It is a further object of my invention to provide a spring clutch wringer mechanism in which the spring element is confined axially and is expanded radially to effect a driving relation.

It is a further object of my invention to provide a wringer construction according to the preceding objects, wherein the controls for the clutch are arranged on the wringer frame adjacent a safety release for the rolls so that operation of the safety release effects a neutral positioning of the clutch controls.

Other objects and advantages will appear from the following description and the appended drawings, wherein:

Figure 1 is a perspective view of a washing machine and wringer mechanism constructed according to my invention;

Figure 2 is a sectional view showing a preferred form of my spring clutch wringer mechanism;

Figure 3 is a sectional view, taken at right angles to the view of Figure 2;

Figure 3a is a sectional view of an alternative form of control for my clutch mechanism;

Figure 4 is a sectional view taken along the line 4—4 of Figure 2;

Figure 7 is an expanded view showing the relation and assembly of parts comprising the spring clutch unit;

Figure 8 is a perspective view of the assembled spring clutch unit;

Figure 9 is a sectional view of a modified form of my invention;

Figure 5:
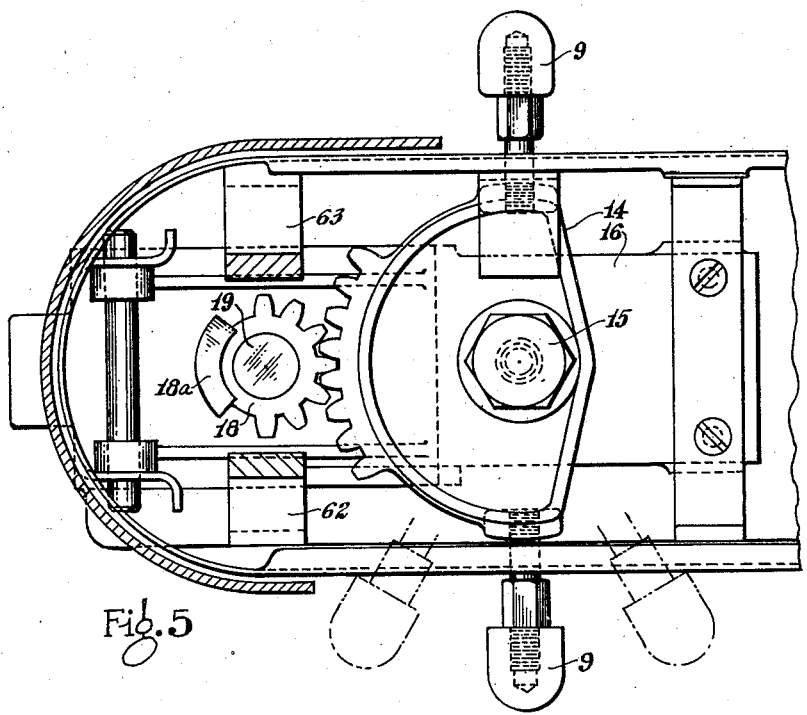
Figure 5 is a plan view, with parts in section, showing the wringer controls in the preferred form of my invention.

I have illustrated the spring clutch wringer mechanism of my invention in the conventional environment of a washing machine and wringer combination; wherein a tub 6 supports by means of the column 7 a wringer indicated in its entirety at 8 in Figure 1. For the convenience of the operator of the washing machine, I have provided on a vertical wall of the wringer a control button 9 which may be moved to either end of the slot 10 to effect a forward or reverse drive through the wringer rolls 11. As will be understood by reference to Figure 5, the control button 9 and its slot 10 are provided on opposite sides of the wringer so that the wringer may be conveniently controlled regardless of the position of the operator. It will also be understood as my description proceeds that the button 9 may be moved to either of its driving positions or a neutral position with very little effort on the part of the operator and that the control itself may be characterized because of this advantage as a "finger-tip" control.

To provide a convenient control for the swinging of the wringer about its supporting column 7, I have arranged at the top of the wringer as at 13, a button which may be depressed to release the swing lock of the wringer. The releasing movement of the button 13 is limited or determined by the position of the finger tip control button 9 and the arrangement and construction are such that it is impossible to swing the wringer when the control button 9 is in either of its driving positions at the end of the slot 10. This is a valuable safety feature and the advantages of an interlock accomplishing this function are well known in the art.

By reference to Figures 2 and 5 it will be observed that the finger tip control button 9 is connected to a segmental gear 14 pivoted to turn on a vertical axis as at 15 on the top of the wringerhead 16. The teeth of the segmental gear 14 are arranged to mesh with a segmental gear 18 secured to a shaft 19 extending downwardly into the gear case 20. The above described arrangement provides that movement of the finger tip control button 9 effects a rotation of the shaft 19 extending into the gear case. The lower end of the shaft 19 which will be hereinafter referred to as the clutch shaft is provided with an eccentric pin 21 having journaled thereon a roller 22 which is adapted to ride in a groove 23 formed in a clutch shifter element 24. The power to drive the wringer is transmitted to the wringerhead in the usual manner by a flat shaft 30 carried within the column 7 at the side of the washing machine. It will be understood by those familiar with this art that a gear case mounted beneath the washing machine tub is provided with a motor and gearing mechanism to rotate the shaft 30. The rotation of the shaft 30 is imparted to the stub shaft 31 extending upwardly into the gear case 20 and said shaft 31 has fixed thereto within the gear case a bevel gear 32 adapted to remain in driving engagement with two larger bevel gears 33 and 34 mounted for free rotation on the roll shaft 35. The last described arrangement results in gears 33 and 34 turning in opposite directions. Whenever, by means hereinafter described, the roll shaft 35 is in clutched engagement with either of gears 33 and 34, the wringer rolls are turned and their direction of turning is dependent upon which of the gears, 33 or 34, the roll shaft is connected to.

Figure 6:
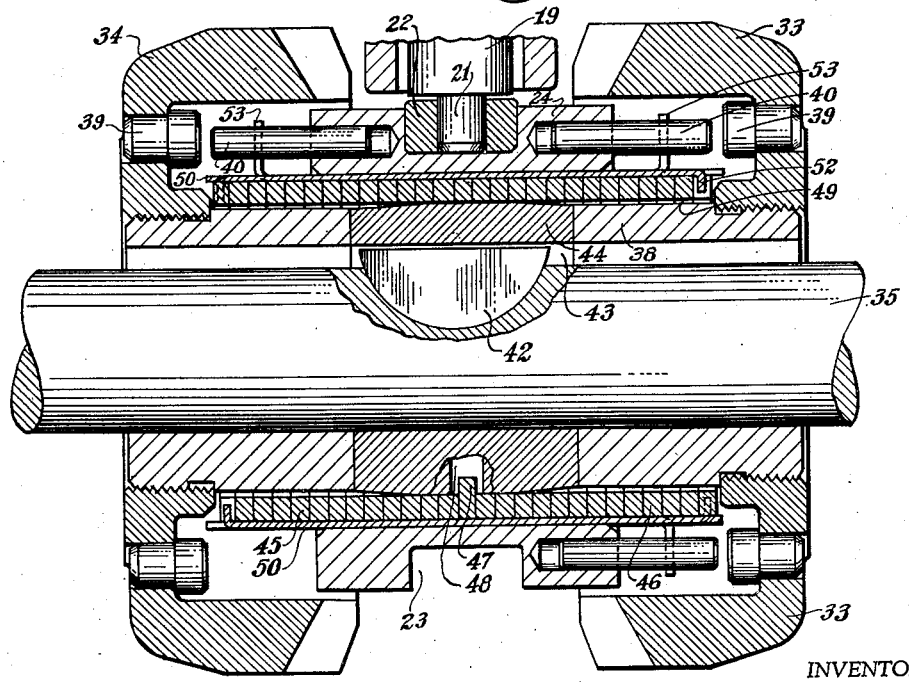
Figure 6 is an enlarged sectional showing of the spring clutch and related gearing.

The gears 33 and 34 are composite in their construction and comprise a hub 38 which is threaded exteriorly to enter internal threaded portions on that part of the gear provided with the teeth. The radial wall of each of the gears is apertured to receive a number of driving pins 39 and the clutch shifter element 24 is apertured at each end thereof to receive driving pins 40. It will be noted by reference to Figures 2 and 6 that whenever the clutch shifter element is moved to a position adjacent either of the bevel gears 33 or 34, the driving pins 40 will be brought into the path of the driving pins 39 so that the rotation of the bevel gear will be imparted to the clutch shifter element 24. In order to transmit the drive to the roll shaft 35, the shaft 35 is provided with a key 42 adapted to enter a complementary key seat 43 in a collar 44 so that the collar 44 is keyed to and turns with the shaft 35. The collar 44 in turn is provided with a pair of oppositely extending coil springs 45 and 46 which are anchored to the collar 44 at their inner adjacent convolutions by having the inturned end 47 thereof projecting into a recess 48 formed in the collar 44. There are two recesses 48, one for the inturned end 47 of each spring. As will be observed by reference to Figure 6, the diameter of the collar 44 in its central part is proportioned with respect to the inner diameter of the coil springs so that there is a snug, pressed-on or frictional fit of the coil spring as well as the anchoring means 47 and 48 to secure the coil springs to the collar 44. I prefer that a slight clearance space 49 be provided between the outer convolutions of the coil springs and the hub portion 38 of the composite bevel gear. The clearance space 49 insures that there will be no frictional drag or binding between the coil spring and the hub of the bevel gear when the clutch is in its neutral or expanded position.

A relatively thin metallic sleeve 50 surrounds the springs and the open ends of the sleeve 50 are slotted as at 51 to provide bendable tabs or ears 52 and 53. The sleeve 50 by means of tabs 52 and 53 establishes a drive between the driving pins 40 and the spring clutch in that the tabs 52 are bent inwardly of the sleeve to engage a bent end portion 54 and the tab 53 is bent outwardly of the sleeve into the path of the driving pin 40. Thus I have provided that when the clutch shifter element 24 is moved axially so that the driving pin 40 thereof is in the path of the driving pin 39, the tab 53 engages the pin 40 to rotate the sleeve and bring the tab 52 into engagement with the end 54 of the coiled spring. The effect of the rotation imparted to the coil spring is to wrap the same and contract the convolutions thereof on the hub 38 of the bevel gear and the collar 44.

It will be observed by the arrangement I have provided that the bent end of the coil spring at the free end thereof is within the surface of revolution of the coiled spring and that during assembly of my spring clutch arrangement it is unnecessary to bend or change the shape of the coil spring in any way. It will be appreciated that the arrangement I have provided eliminates the bending of any unsupported end portion of the coil spring during its wrapping or contracting action. One of the advantages of my arrangement is that the coil springs themselves may be accurately formed and heat treated after forming and the assembly requires no forming operation on the spring which would tend to disturb the exact proportions and operating characteristics desired in spring clutches of this type.

A further advantage present in the arrangement I have provided is that the coil spring is restricted in movement to relatively narrow limits by the inturned tabs 52 which prevent any longitudinal shifting of the spring during its operation. In other words, the axial and radial movements of the spring during its operation are restricted to that small amount of movement required to contract and grip the coaxial surfaces within the coil spring.

I have found that when coil springs of this character are permitted to flex or shift extensively, beyond that required for clutching action, the repeated extensive flexing fatigues the metal and causes failure of the spring. I have also found that to obtain a smooth, positive action and long life in springs of this character, the springs should be heat treated and rendered soft and flexible. The springs are preferably machined interiorly thereof to increase the engaging area and to insure that the inner cylindrical surface formed will be a true cylinder engaging the clutching surfaces within the spring throughout their extent. According to my invention, all of the desirable forming operations on the spring may be employed and their effects retained to produce uniform units that will retain their smooth operating characteristics over a long period of use.

To insure that the wringer in its entirety may not be swung about its supporting column 7 when the wringer rolls are turning, the index or latch pin 60 is controlled by a manually operated release which is designed to be limited in action by the position of the gear segment 18 on the clutch shaft 19. The manually operated release button 13 on the top of the wringer is connected by a link 61 which terminates in a pivotal connection at its lower end with a bail 62—63 surrounding the wringerhead. The portions of the bail 62—63 disposed in alignment with the clutch shaft 19 extend horizontally and in the raised position of the bail as shown in Figures 2 and 3, the flange 18a on the gear 18 is free to turn beneath the horizontal portions of the bail. However, when the button 13 is depressed and said horizontal portions are lowered, they will prevent rotation of the shaft 19 by reason of the flange 18a abutting the sides of the horizontal portions of the bail. This means that the finger-tip control and its associated parts must be in a neutral position as shown in Figure 5 before the latch pin release member 13 may be depressed. The lower ends of the bail 62—63 are pivoted to a U-shaped lever 64 which is connected in the bight portion thereof to a pin 65 on the index pin 60. The U-shaped lever 64 is pivoted in the side walls thereof as at 66 and 67 to the gear case and a lowering movement of the bail causes a raising of the latch pin 60 to permit the same to move clear of the flange 68 on the wringer column. The flange 68 on the wringer column is apertured in the conventional manner at spaced points such as 69 so that the latch pin may be lowered and secure the wringer in any desired position with respect to the tub. The latch pin is lowered to its latching position by a spring 70 mounted between pin 71 on the latch pin and boss 72 at the lower end of the wringerhead.

For certain types or models of washing machines, it may be desirable to mount the clutch operating means on the end of the wringer rather than at the sides thereof as in the preferred embodiment. For such types or models I have provided the arrangement shown in Figure 3a wherein the handle 75 is fixed to a horizontal shaft 76 in the handle 75 is fixed to a horizontal shaft 76 journaled in the boss 78 on the gear case. The inner end of the shaft 76 is provided with a bevel gear 77 which is designed to mesh with gear 79 carried by the vertical shaft 19.

With a gear case constructed according to my invention, it will be understood that a single form of gear case may be employed throughout a line of washing machines and that the controls thereof may be varied to suit the different models. For instance, the clutch shaft 19 may be extended vertically and provided with a handle at the top of the wringer. Thus my gear case construction eliminates the need for a different gear case for the different models and a resultant saving in production costs. To resiliently maintain the shaft 19 in any position to which it may be moved, the gear 79 is provided as at 81 with recesses in its periphery to receive a spring-pressed, restraining element 80.

The assembly of the preferred form of my spring clutch wringer mechanism is obtained by sliding the shaft 35 axially through the bearing boss 82 into a unit comprising the member 44, the springs 45 and 46, the sleeve 50 and the clutch shifting element 24. The springs 45 and 46 are assembled on the member 44 with their inturned ends 47 arranged in recesses 48 in the central portion of member 44. Thereafter the sleeve 50 is arranged about the two springs and the tabs 52 bent inwardly of the sleeve to engage the free ends of the clutch springs. The clutch shifter element 24 is then moved axially on to the sleeve-and spring-assembly and the tabs 53 of the sleeve are turned outwardly into the path of the driving pins 40.

The sub-assembly comprising shifter 24, sleeve 50, springs 45—46 and the member 44 may receive the shaft 35 as it is moved axially into the gear case. The sub-assembly referred to with the tabs 52—53 bent as described is illustrated in perspective showing of Figure 8.

The assembly method described contemplates that the two bevel gears 33 and 34 are arranged within the gear case in positions shown prior to the insertion of shaft 35. Thereafter the clutch shaft 19 may be moved downwardly into assembly with its roller 23 and thence into the clutch groove of the shifter element to complete the assembly. The bearing bosses for the various shafts in the gear case may be provided with lubricant grooves 84, 85 and 86 as shown and it is intended that the gear case be filled with suitable lubricant before the gear case cover 87 is applied to the gear case.

Although the above-described, preferred form of my invention, utilizing contracting coil spring clutch elements, is well suited to most wringer mechanisms, I am aware that it may be desirable in some instances to employ an expanding type of clutch spring. For the latter installations I have illustrated in Figure 9 a modified form of my invention, wherein an expanding type of clutch spring element is used. Preferably the spring element is confined so as to limit its movements and in this respect the modified form possesses some of the advantages found in the preferred form of my invention.

The expanding type of spring clutch mechanism, according to my invention, includes the usual roll shaft 100 mounted horizontally in the gear case 105 containing the bevel gears 103—104 adapted to be rotated in opposite directions by a bevel gear 106 on shaft 102. In this form of my invention, the spring clutch elements 107—108 are anchored as at 109 and 110, respectively, to the bevel gears 104—103.

Referring particularly to the gear 104 and its associated parts, the spring 107 is retained in its anchored position by sleeve 111 which is provided with a shoulder 112 at one end designed to bear against the end convolution at the free end of the spring. The other end of the sleeve is fixed to the gear 104 by peening the same outwardly over a chamfer on the gear as at 113. The clutch shifter element 115 is provided with an annular groove to receive an eccentrically mounted roller 116 on the control shaft 101 and when the shifter element 115 is shifted to the left as shown in Figure 9, the free end 117 of the spring 107 is adapted to engage in any one of a series of axially extending holes 118 so that the rotation of the gear 104 and its coil spring 107 tends to unwind or expand the spring. The expansion of the coil spring brings the outer convolutions thereof to bear against coaxial surfaces on the gear 104 and the clutch shifter element 115. Since the clutch shifter element is keyed to the shaft 100 by key 120 having a sliding fit in the groove 121, the rotation imparted to the shifter element is transmitted to the roll shaft 100. The gear 103 is provided with a clutch spring and sleeve arrangement like that described in connection with gear 104 and operates in a similar manner when the clutch shifter element 115 is shifted to the right so as to reverse the direction of rotation in the roll shaft 100. The shifter element 115 is proportioned so that it may be placed in a "neutral" position wherein it is free of engagement with either of the clutch springs.

A suitable latching device such as 80—81 of the preferred embodiment may be employed to hold the shifter element 115 in either of its engaged positions or in netural.

Figure 10:
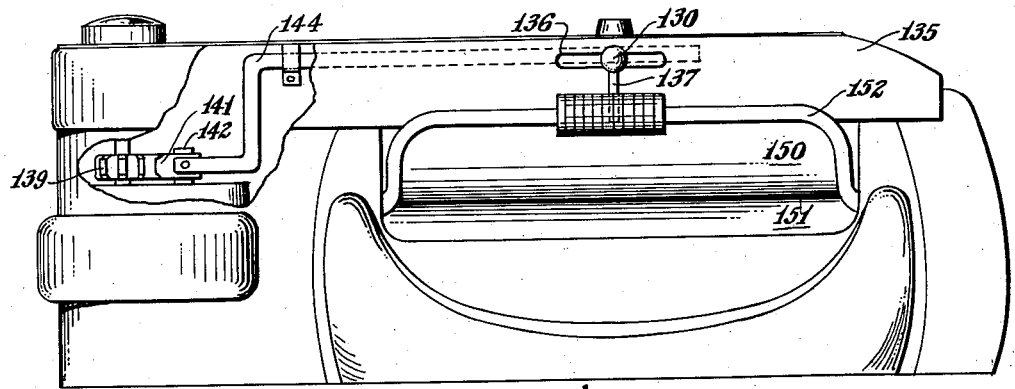
Figure 10 is an elevation with parts broken away of a modified form of my invention, wherein the clutch control is operatively associated with a wringer safety release.
Figure 12:
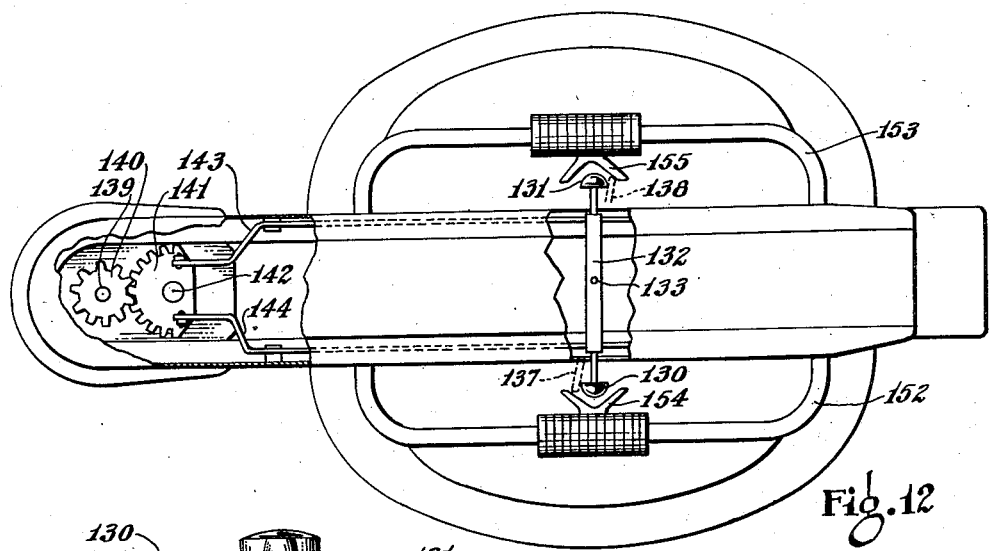
Figure 12 is a plan view of the modification shown in Figure 10.
Figure 11:
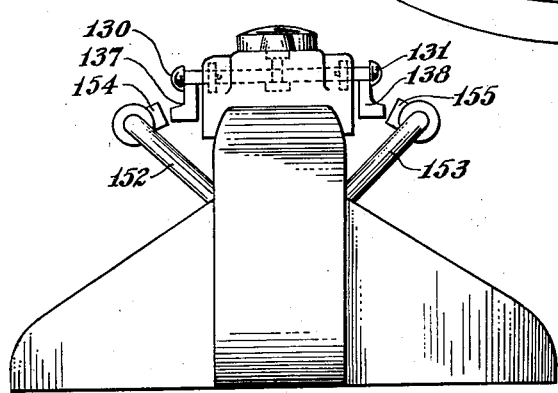
Figure 11 is an end elevation of the modification shown in Figure 10.

The wringer clutch arrangement which I have provided is well suited to the use of clutch controls remote from the wringerhead and I have shown in Figures 10 to 12, inclusive, a modified form of the invention wherein the controls for the wringer clutch are carried by the top bar of the wringer frame. In the form illustrated the top bar of the wringer frame 135 is slotted as at 136 on the vertical sides thereof above the wringer rolls and a bar 132 is pivoted as at 133 so as to swing through a limited arc within the top of the wringer frame.

Manually-operated control buttons 130—131 are carried by extensions on the pivoted bar 132 and said extensions carry depending lugs 137 and 138, respectively.

The wringerhead is provided with the usual vertical shaft and gear arrangement 139—140 adapted to be operated by a segment gear 141 which is pivotally mounted on the wringerhead as at 142. Horizontally-extending, operating bars 143—144 are pivoted to the segmental gear 141 at opposite sides of the gear pivot 142. The ends of the operating bars 143 and 144 remote from the segmental gear are secured to the ends of the pivoted bar 132 so that a turning of the bar 132 about its pivot 133 effects a similar rocking motion in the segmental gear 141 to control a clutch within the wringerhead.

The wringer frame is provided with the usual rolls 150 and 151 adapted to be urged toward each other in the conventional manner. The wringer frame is also provided with a manually-operated, safety-release bar at each side thereof. In the form illustrated, the safety-release bars 152 and 153 are pivotally mounted in the wringer frame at each end and the horizontal portion of the release bar extends across the wringer frame adjacent the rolls so that in the event clothes are entangled in the wringer rolls or any other emergency requires, the bars may be moved to release the pressure upon the wringer rolls.

The safety-release bar 152 is provided at the central portion thereof with a V-shaped member 154 which embraces the depending lug 137 on the clutch control. It will be observed by reference to Figures 11 and 12 that when the clutch control button 130 is moved from its neutral position shown, to effect either a forward or reverse drive of the rolls, the depending lug 137 will be positioned adjacent the wide portion of the V-shaped member 154. In the event the safety-release bar 152 is operated to release the wringer rolls, the movement of the V-shaped member 154 will effect a camming action on the lug 137 so as to restore the lug and its associated control button 130 to a neutral position. The advantage of this arrangement will be appreciated when it is understood that it is desirable to stop the drive to the wringer rolls as soon as an emergency requires operation of the safety release for the rolls.

The safety-release bar 153 is provided with a V-shaped member 155 which is designed to engage the depending lug 138 as described in connection with the parts 154 and 137 on the other side of the wringer. It will be understood by those skilled in this art that the ease with which the spring clutch for the wringer mechanism may be engaged or disengaged contributes to the simple and effective arrangement for operation by the safety release which I have provided.

Although I have shown and described different forms of my invention in considerable detail, it will be understood that modifications and changes may be made therein without departing from the scope of my invention as defined in the following claims.

Having thus described my invention, what I claim is:

1. A spring clutch comprising a driving gear mounted for rotation on a driven shaft, said gear having a cylindrical surface formed therein, an element keyed to said shaft and adapted to be moved axially thereof, said element having a cylindrical surface therein aligned with the cylindrical surface on said gear, a coil spring secured to said gear at one end thereof having an axial extent corresponding substantially to the combined axial extent of said two cylindrical surfaces, a sleeve secured to said gear at one end and provided with outwardly extending portions at the other end to engage the free end of the spring and inter-engaging means on said element and spring to effect expansion of said spring into clutching engagement with such cylindrical surfaces.

2. A spring clutch comprising a constantly rotating driving gear mounted on a driven shaft, said gear having a cylindrical surface, an element keyed to said shaft and adapted to be moved axially thereof, said element having a cylindrical surface aligned with the cylindrical surface on said gear, a coil spring mounted on said gear at one end thereof to rotate therewith, said spring having an axial extent exceeding the axial extent of the cylindrical surface on said gear, a sleeve secured to said gear at one end and provided with outwardly extending portions at the other end to engage the free end of the spring, and inter-engaging means on said element and sleeve to effect expansion of said spring into clutching engagement with such cylindrical surfaces.

PAUL E. FRANTZ.